United States Patent [19]

Stecker

[11] Patent Number: 5,298,212
[45] Date of Patent: Mar. 29, 1994

[54] METHOD FOR FORMING A LAMINATED SUBSTRATE

[75] Inventor: William M. Stecker, Chapel Hill, N.C.

[73] Assignee: Surface Technologies, Inc., Durham, N.C.

[21] Appl. No.: 853,404

[22] Filed: Mar. 18, 1992

Related U.S. Application Data

[63] Continuation-in-part of Ser. No. 642,062, Jan. 16, 1991.

[51] Int. Cl.$^5$ ............................................. B29C 39/42
[52] U.S. Cl. ..................................... 264/571; 264/510
[58] Field of Search ............... 264/510, 512, 511, 101, 264/102, 552, 571

[56] References Cited

U.S. PATENT DOCUMENTS

| | | |
|---|---|---|
| 2,614,955 | 10/1952 | Halsall . |
| 3,055,058 | 9/1962 | Hartesveldt . |
| 3,341,396 | 9/1967 | Iverson . |
| 3,840,239 | 10/1974 | Fazekas et al. . |
| 3,957,943 | 5/1976 | Ogura . |
| 3,997,286 | 12/1976 | Gabrys . |
| 4,076,788 | 2/1978 | Ditto . |
| 4,081,578 | 3/1978 | van Essen et al. . |
| 4,204,822 | 5/1980 | Hewitt . |
| 4,267,142 | 5/1981 | Lankheet . |
| 4,311,661 | 1/1982 | Palmer . |
| 4,367,192 | 1/1983 | Arnason . |
| 4,438,062 | 3/1984 | Griffith et al. . |
| 4,488,862 | 12/1984 | Epel et al. . |
| 4,612,149 | 9/1986 | Iseler et al. . |
| 4,855,097 | 8/1989 | Iseler et al. . |
| 5,055,324 | 9/1991 | Stecker . |

OTHER PUBLICATIONS

Ford et al., U.S. Statutory Invention Registration, Reg. No. H565, Published Jan. 3, 1989.

Primary Examiner—Catherine Timm
Attorney, Agent, or Firm—Bell, Seltzer, Park & Gibson

[57] ABSTRACT

A method of producing a substantially finished surface on the outmold side of a thermosetting casting. The method entails preparing a first laminae having a curable thermosetting resin material as a first outmold surface, and providing a second laminae having an imprinted surface thereon. The first surface and second laminae having an imprinted surface are then positioned in face-to-face registration with one another. Substantial vacuum conditions are generated in the area between the first surface and the imprint surface, and the surfaces are pressed together under substantial vacuum conditions. The vacuum and pressure conditions maintain the surfaces in face-to-face registration and contain any volatile components of the curable thermosetting resin material of the first laminae while the curable thermosetting resin material cures. After the curable thermosetting resin material cures, the second laminae having an imprinted surface is separated from the first laminae to form the substrate having the imprint of the second laminae.

4 Claims, 1 Drawing Sheet

METHOD FOR FORMING A LAMINATED SUBSTRATE

RELATED APPLICATION

This application is a continuation-in-part of U.S. Ser. No. 07/642,062 filed Jan. 16, 1991, now abandoned, the entirety of which is incorporated herein by reference.

BACKGROUND OF THE INVENTION

This present invention relates generally to a method for forming a molded surface and, more particularly, to a method for creating a substantially defect free and bubble free molded surface on the outmold side of a casting or other surface using thermosetting resin systems.

In the thermoset casting industry, a thermosetting resin is poured into a mold of desired configuration, or applied to a substrate, and then allowed to cure. After sufficient curing time, the cured product is removed from the mold or substrate for further use or processing. The surface portion of the cured product which is in contact with the mold or substrate is referred to as the "inmold" side, whereas the surface portion of the product opposite the mold or substrate surface is referred to as the "outmold" side. Standard casting methods predominantly use the inmold side of the product as the "good" or finished side of the product. This is because the inmold side conforms to the mold or substrate surface and can be provided with an desired patten or surface texture, thus resulting in a substantially finished surface. In contrast, the outmold side of the product is open to ambient conditions as it cures and thus has neither the functional nor aesthetic qualities of the inmold side.

In a typical inmold casting method designed to use the inmold side, a mold or substrate surface is prepared by waxing and polishing. Following this preparation, a thin coat of resin referred to as a gel coat is sprayed or otherwise applied onto the mold or substrate surface. A matrix of thermosetting resins and various inorganic fillers is then poured, sprayed or otherwise applied into the mold or onto the substrate. The thermosetting resin bonds to the gel coat. After sufficient curing time, the entire molded part is removed from the mold or substrate. In the above process, the inmold surface of the article is essentially in finished form, whereas the outmold surface is generally pitted, flawed and irregular.

A limited number of outmold casting techniques are known in the prior art. On such outmold casting technique is described in U.S. Pat. No. 3,341,396 issued to E. M. Iverson. In this patent, a pigmented base layer of a resin material is applied to a substrate, after which a base layer having a color pigment is applied to the base layer. This is followed by application of a transparent coating on top of the pigmented layer. Flow and diffusion of the pigmented layer is then induced by movement of a tool through the transparent layer. In a further outmold method described in U.S. Pat. No. 5,055,324 issued to Stecker, a resin system is poured onto a substrate. In the above described outmold casting methods, the top or outmold side of the article is generally pitted, flawed and irregular. Thus, such surfaces require significant sanding and polishing to create an acceptable finished surface.

Limitations exist with respect to both inmold and outmold casting techniques. A principal advantage of an inmold system is that the inmold surface of the molded article is essentially finished in final form as it is removed from the mold or substrate. The ability to create pigmented patterns within the molded article is, however, limited. A principal advantage of an outmold casting method is the ability to create different and desirable pigment patterns in the molded article either by inducing physical motion as described in Iverson U.S. Pat. No. 3,341,396 or by inducing controlled diffusion of pigment as described in Stecker U.S. Pat. No. 5,055,324. A disadvantage of conventional outmold casting processes is that the outmold surface is pitted and flawed. Thus, the surface must be accepted complete with flaws and imperfections or must be sanded and polished in order to fully finish the surface. Such a step can be expensive and time-consuming.

Another alternative is to utilize injection molding in a closed mold. Injection molding techniques are often limited to thicker articles inasmuch as the cross-section of the article is reduced, the tendency to develop unsightly swirls and patterns is increased.

Accordingly, there is a need in the art for a method to create a substantially finished molded surface which substantially eliminates any sanding, polishing or further finishing.

SUMMARY OF THE INVENTION

In accordance with the method of the present invention, a substantially finished surface is created on the outmold side of a thermosetting casting without sanding, polishing or other finishing.

The method of the present invention includes forming a first laminate by preparing a base resin mixture and applying the same to a substrate or to a first mold surface with the desired pigment and pigment dispersion components. The base resin mixture is a curable thermosetting resin material and can be substantially uncured or can be partially cured. Next, a second laminae having a second surface is formed by applying at least one layer of the same resin as the base resin material or by applying at least one layer of a second curable thermosetting resin material of different composition than the base resin material to a second mold surface to form a gel coat or the like. For example, the second laminae can be formed by applying a thin coating of the resin material to the second mold surface such as by spraying the coating thereon. Although not necessary in all cases, the resin material or materials are partially cured to the point of being a gel stage, after which their respective out surfaces are positioned in face-to-face registration with one another. Air is then evacuated from between the respective surfaces of the first laminae and second laminae, and the surfaces are moved into engagement with one another under pressure. The pressure maintains the face-to-face registration and contains any volatile monomer or monomers of the resin materials. After pressure is applied, vacuum is no longer needed. When the resin mixture resin materials are fully cured, the pressure is released and the mold surface removed. The result is a product exhibiting the desired pigment pattern with a finished outmold surface needing little, if any further sanding, polishing or finishing.

In an alternate method of the present invention, it is contemplated that the second curable thermosetting resin material (e.g., the gel coat) can be applied directly to a finish laminate comprised of various other substrates such as plywood, pressed wood or the like to create a molded surface which is in substantially finished form. In this case, such substrate must be a material to which the second resin material will bond either inherently or through the use of appropriate adhesives.

A further alternate method of the present invention is to imprint a surface of desired texture of pattern to the outmold surface of the first laminate by evacuating air from between the outmold surface of the resin base and the second surface of a second laminae having an imprinted surface and pressing the same together. The curable resin material is then allowed to cure. The first laminae and the second laminae are separated, with the first surface of the first laminae having the imprinted surface of the second laminae.

Accordingly, it is an object of the present invention to provide a method for creating a surface on the outmold side in a curable resin system which substantially eliminates sanding, polishing or other finishing.

Another object of the present invention is to provide a method for creating a substantially defect free and bubble free laminate or outmold surface.

These and other objects of the present invention will be come apparent with reference to the drawings, the description of the preferred embodiment and the appended claims.

DETAILED DESCRIPTION OF THE PREFERRED EMBODIMENTS

Figure 1:
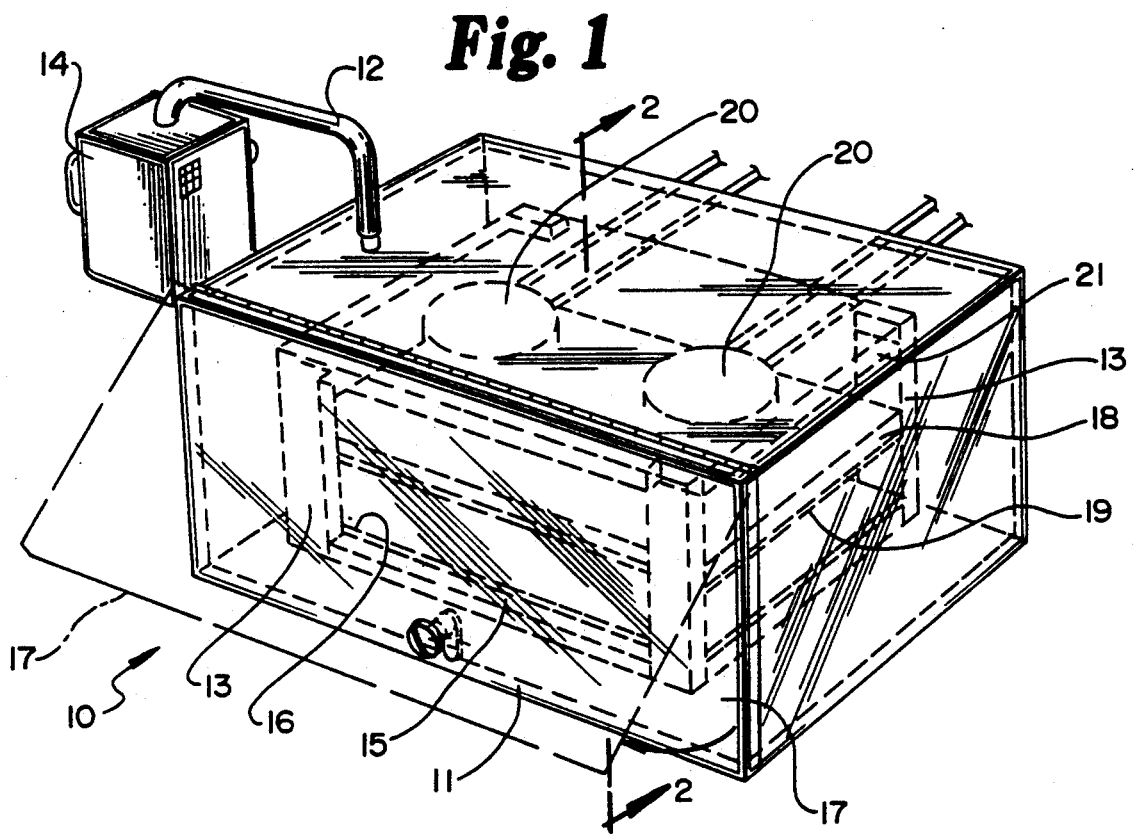
FIG. 1 is a perspective view of an apparatus utilized in the method of the present invention.
Figure 2:
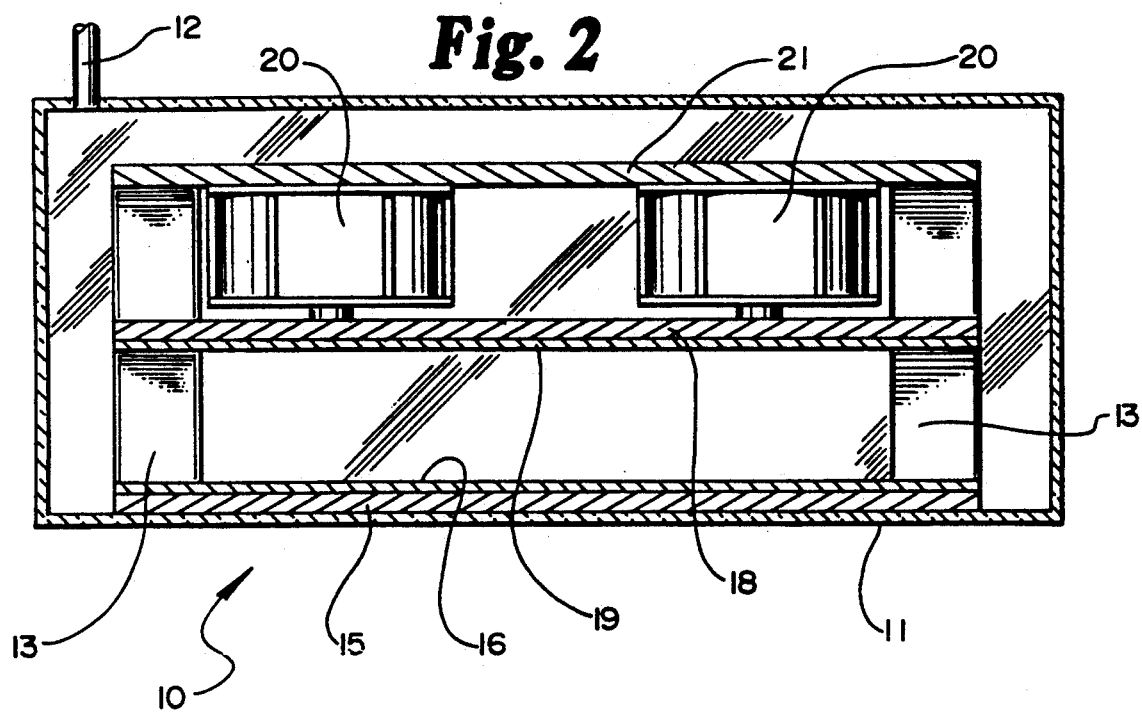
FIG. 2 is a sectional view of the apparatus as viewed along the section line 2—2 of FIG. 1.

The present invention relates generally to a method for forming a substrate having a substantially finished molded surface. In accordance with the method of the present invention, this is accomplished by preparing a first laminae having a first surface of a curable thermosetting resin material. This is followed by preparing a second surface of a second laminae to which the first laminae is to be laminated. The second laminae (i) can be a gel coat of the curable thermosetting resin material or of a different curable thermosetting resin material, (ii) can be a laminae having one or more layers or (iii) can have an imprinted surface. The first and second surfaces are then positioned in face-to-face registration with one another and pressed together under substantial vacuum conditions to maintain the face-to-face registration and to contain any volatile components of the curable thermosetting resin material or materials. The result is a substantially defect and bubble free surface which is substantially in finished form and requires little, if any, sanding, buffing or the like.

As used herein, unless otherwise noted, the term "curable thermosetting resin material" relates to a substantially uncured resin or partially cured resin. The term "partially cured resin" relates to the state of a resin between the time it is poured or applied to a surface and begins to cure, and the time it is substantially fully cured. The term "thermosetting resin" is intended to relate to a resin that solidifies and "sets" by curing. Further, the term "laminae" relates to a layer or layers of material such as, but not limited to, a substrate or a gel coat.

The first laminae or so-called "base coating" is prepared, for example, if a generally flat casting is desired, by preparing a casting bed or mold having a bottom base mold surface and a continuous side edge or retaining ring to define an area into which the curable thermosetting resin material may be applied. Preferably, the base and side surfaces of the casting mold are provided with a release coating such as a silicon release agent, a wax in the carnauba wax family or any similar material which will function as a release agent or releasing coating for the particular resin material being used.

The curable thermosetting resin material is then applied to the casting mold for curing. The preparation of the curable thermosetting resin material is well known in the art and generally involves mixing of the resin material with various filler materials such as alumina trihydrate or other materials to impart desired properties to the resin system. An appropriate catalyst and the desired tinting or pigment materials are also combined with the resin material. The mixing of the resin material can include mixing under vacuum to remove any air entrapped by the mixing process.

Although a variety of resin materials will function satisfactorily, the resin material should preferably be a thermosetting resin such as polyesters, epoxies, urethanes, or any other similar resins having various volatile components which cure without releasing solvents and/or gases therein. The selection of suitable resins will be within the skill of one in the art. A specific example of an acceptable resin material is described in Stecker U.S. Pat. No. 5,055,324, the entirety of which in incorporated herein by reference.

At the same time the curable thermosetting resin material is being prepared, or during the time such system is curing, the second laminae, e.g., the gel coat or imprinted surface (i.e., a caul sheet) is positioned on a transfer mold surface. Preferably, this transfer mold surface conforms substantially to the configuration of the base mold surface and is prepared by polishing the same. If a very smooth surface is desired, the transfer mold surface is highly polished, is constructed of a material which has a very smooth surface such as glass or the like, or the imprint surface is very smooth. An appropriate release coating is then applied to the mold surface after which the mold with the release coating thereon is again polished to remove imperfections, etc. The second laminae in the form of a thin film of clear or colored resin material is then applied to the transfer mold surface to form what is known in the art as a gel coat. Such application can occur by spraying, rolling or curtain coating the material to the desired thickness. Preferably, the thickness of this material after application is approximately 8–10 mils.

The next step in the preferred method is to allow the curable thermosetting resin materials including the gel coat of the second laminae to partially cure. In some cases this can be almost immediately after application or pouring, while in other cases it is desirable to allow further curing. The preferred method contemplates allowing the curable resin material and gel coat to cure to the point where they are in a gel stage. At this point, the curable thermosetting resin materials have the approximate consistency of a jelly. Both, however, are still subject to limited levelling and other movement to remove imperfections, etc. It should also be noted that a partial cure of the surfaces is not necessary, provided at least one of the surfaces is wet or partially cured; or if both surfaces are fully cured, a wet or partially cured resin or an adhesive layer is disposed between them.

The respective outer surfaces of the first laminae and the second laminae are then positioned in generally face-to-face registration and placed in a vacuum chamber or other means from which air can be substantially removed. The two surfaces are then pressed together under a pressure sufficient to cause the respective surfaces and imperfections within such surfaces to level out while avoiding moving the resin. This pressure is often greater than about 5 psi and preferably greater than about 50 psi. The actual pressure will depend upon the materials being used and the degree of curing, among other factors. The preferred pressure is about 80 psi. Preferably the vacuum generated in the vacuum chamber when the surfaces are pressed together is sufficient to draw greater than about 15 inches of mercury, more preferably to draw greater than about 20 inches of mercury and most preferably to draw greater than about 25 inches of mercury. Generally, the greater the vacuum the better. Such vacuum conditions are sufficient to remove air from between the surfaces while containing any volatile components of the curable thermosetting resin material or materials. This result in a high quality, defect and airborne particles bubble free lamination of the gel coat to the first laminate.

The resin materials of the first laminae and second laminae which are pressed together under substantial vacuum and pressure conditions are then allowed to fully cure at an appropriate curing temperature for the necessary curing time. During the curing time, it is not necessary to maintain the vacuum conditions. The specific curing temperature and curing time will, of course, depend upon the particular resin systems being utilized and is information which is well known in the art. Following substantially full cure, the transfer mold surface is removed. This leaves a top or outmold surface having an exact image of the transfer mold surface. The mold casting with finished top surface can then be removed from the casting mold for further processing.

A first modification of the above described preferred method involves the transfer of a surface or imprint pattern to the curable resin material rather than the transfer of a gel coat. In this method, the curable resin material is prepared in a manner similar to that described above. During the time the curable thermosetting resin material is being prepared or during the time it is partially curing, an imprint surface is prepared on the second laminae with the desired surface configuration or pattern. Such imprint surface can include, but is not limited to, surfaces comprised of glass, plastic laminates, mylar film, fiberglass panel or the like. Such surface is preferably provided with a release coating, such as a silicon release agent, carnuba wax or the like and is polished after application of the release coating to remove the imperfections.

After the curable resin material of the first laminae has partially cured to the desired degree, preferably to the gel stage when the system has a jelly consistency, the outer or top first surface of the curable thermosetting resin material and the imprint surface are positioned in face-to-face registration with one another. Substantial vacuum conditions are then generated in the area between the surfaces, and the surfaces are then pressed together under conditions similar to those described above or by utilizing a hot platen vacuum press available from Wemhöner Co. of Stüttgart, Germany. As a result of the vacuum and the pressure conditions, all air is removed from between the respective mold and imprint surfaces and the top or outmold side of the base casting is levelled and takes on the surface characteristics of the imprint surface. After the curing process is complete, the first laminae and second laminae are separated and the second laminae is removed leaving the top or outmold surface of the casting with a finished, bubble free surface requiring little, if any sanding, polishing or finishing.

Another modification of the method of the present invention is form a first laminae by applying or laminating a thin coating such as a gel coat or the like to a substantially dry substrate such as a piece of plywood, pressed wood, fully cured resin casting, or the like. As described above, a gel coat is applied to the top or outmold surface of the partially cured resin material. In this alternate method, the substrate or surface to be coated is prepared by appropriate sanding and cleaning. Next, the second laminae comprising the gel coat and the substrate is prepared similar to that described in the preferred method above. The gel coat is allowed to partially cure. When the gel coat has partially cured to the desired point, the surface of the first laminae to which the gel coat is to be applied and the outer surfaces of the gel coat are placed in face-to-face registration with one another in a vacuum chamber or other means which can remove air from between the surfaces. The respective surfaces are then pressed together under the appropriate vacuum and pressure condition and are allowed to cure. After the gel coat is fully cured, the transfer mold surface is removed, leaving a top surface to the substrate which is substantially in finished form and needs no further sanding, polishing or the like.

It should be noted that the dry substrate to which the gel coat is laminated in this particular embodiment can comprise a variety of different materials such as plywood, pressed wood, fully cured resin or the like. Such material, however, should be a relatively porous or abraded material to facilitate adherence during the curing process and thereafter.

In another modification of the method of the present invention, a top or outmold surface of a dry material such as plywood, pressed wood, fully cured casting or the like is provided with a finished outmold surface. In this alternate method, the first laminae is a dry substrate or surface prepared by sanding and cleaning the same. A thin layer of the curable thermosetting resin material such as a gel coat is then formed by applying an appropriate resin to the top surface of the substrate and allowing it to partially cure. After the gel coat has partially cured to the desired degree, a prepared second laminae having an imprinted surface is placed in face-to-face registration with the outer surface of the gel coat in a vacuum chamber or other means for removing air from between the surfaces. The respective outer gel coat surface and the imprinted surface are then pressed together under appropriate vacuum and pressure conditions and allowed to fully cure. The second laminae is then removed from the first laminae leaving a surface having the imprint of the imprinted surface which needs little, if any, further sanding, polishing or other finishing.

In a fourth modification of the method of the present invention, a first laminae comprising the curable thermosetting resin is applied to a mold surface and allowed to fully cure. This is followed by forming a gel coat thereon by spraying or other form of application. After the gel coat has partially cured, the surface of a second laminae comprising a second dry substrate such as plywood, pressed wood, fully cured casting or the like is placed in face-to-face registration with the surface of the partially cured gel coat and the same is pressed together under substantial conditions until the gel coat is fully cured. This results in the curable thermosetting resin and the second substrate being laminated together with the gel coat therebetween.

In all of the above described embodiments of the method of the present invention, a pair of surfaces are placed in face-to-face registration with one another and pressed together under appropriate vacuum and pressure conditions sufficient to remove air from between the surfaces and to eliminate irregularities and imperfections therein. As described above, at least one of the surfaces must include a curable thermosetting resin material while the second surface can include either a second partially cured resin, a dry substrate or an imprint surface. Thus, the steps of the method of the present invention include preparing a first surface comprised of a partially cured thermosetting resin material, preparing a second surface comprised of either a second partially cured thermosetting resin material, a dry substrate or an imprint surface, placing the first and second surfaces in face-to-face registration with one another and pressing the surfaces together under vacuum and pressure conditions and then allowing the partially cured resin or resins to fully cure.

Having described the preferred and various alternate embodiments of the method of the present invention, an apparatus suitable for the practice of the present invention can be described with reference to FIG. 1. FIG. 1 is a schematic illustration of the apparatus used in performance of the method of the present invention. The apparatus is illustrated generally by the reference numeral 10 and includes a chamber or enclosure 11 which can be selectively sealed to provide an airtight enclosure. The enclosure 11 includes an access end having a door 17 which can be selectively opened to permit access to the interior thereof. Connected with the interior of the enclosure 11 is a conduit 12 which is, in turn, connected to a conventional vacuum pump 14 for selectively withdrawing air from the interior of the enclosure 11.

Disposed within the enclosure 11 is an apparatus frame comprising a plurality of frame corner members 13, a lower platen 15 rigidly secured to the lower interior portions of the corner members 13 and a top, pressure support member 21 rigidly secured to the top portions of the corner members 13 and connected with an upper steel platen 18 via pressure exerting means 20. Such means o can be any mechanism capable of exerting pressure such as hydraulic or mechanical means. The preferred embodiment, however, contemplates the use of hydraulic ram means 20. Disposed on the lower platen 15 is the first laminae 16 having a surface which is intended to be coated or surfaced in accordance with the present invention. As described above, this first laminae 16 can comprise a partially cured resin surface, a dry substrate, or a dry surface with a gel coat thereon. The upper steel platen 18 is connected in movable relationship relative to the frame support member 21 by the pair of hydraulic rams 20. Connected with the platen 18 is a mold or transfer surface 19 i.e., the second laminae. This element 19 could comprise a mold with a fully or partially cured thermosetting resin, a dry substrate, a gel coat or an imprint surface.

The hydraulic rams 20 are connected with an appropriate source of fluid pressure and function to move the upper platen 18 and thus the transfer mold or surface 19 connected thereto, into an out of engagement with the surface of the substrate 16. The rams 20 also function to create the desired pressure between the surfaces 16 and 19. The mold or transfer surface 19 can be connected with the upper platen 18 through any conventional means such as threaded members, latch mechanisms or the like.

The present invention can be further understood by reference to the following specific examples:

EXAMPLE 1

A panel with a "marble" pattern therein and a high gloss outmold surface was fabricated by first preparing a first laminae comprising a curable thermosetting resin system comprising 50 parts by weight of an isopthalic polyester resin, namely, a clear casting resin manufactured by H & K Research of Hickory, N.C. under the number R0059, and 50 parts by weight of alumina trihydrate filler. These two components were first mixed together and then catalyzed with 2 parts methy ethyl ketone peroxide (MEKP).

This system was tinted by adding 0.1 part by weight of titanium dioxide pigment together with various marbleizing pigments. The resin system was mixed by machine and poured from a batch container onto a horizontal caul sheet which had been previously prepared with a wax release coat. The poured resin system was allowed to cure until it reached a gel or rubbery stage of cure at the base. The upper surface of the resin system remained wet and tacky.

The casting was then placed in the vacuum chamber. The chamber was sealed and air evacuated until a vacuum of 24 inches of mercury was drawn. An imprint surface of a second laminae which had been previously prepared by waxing was then lowered and pressed against the first surface of the partially cured resin of the first laminate under the vacuum conditions and under a pressure of 80 psi. The entire chamber with the casting therein was then transferred to a curing room where a full cure was allowed to take place at 100° C. for eight hours. The imprint surface was then removed and the resulting first laminae had a substantially bubble free outer surface exhibiting an exact image of the surface of the second laminae.

EXAMPLE 2

In this example, a transfer coating was applied to a partially cured thermosetting resin casting. The resin system of the first laminae was prepared as in Example 1 above and placed in the vacuum chamber. A transfer surface was then polished, after which a mold release coating was applied and then repolished. A second laminae comprising a film of clear, catalyzed resin material was then sprayed onto the transfer surface to a thickness of approximately 8–10 wet mils to create a gel coat. After about 15 minutes, the resin material had cured to the point of being in a gel state. The transfer mold was placed in the vacuum chamber above the resin system, the chamber was sealed, air was removed from the chamber to create vacuum conditions similar to that of Example 1 and the outer surface of the second laminae and the outer surface of the first laminae were pressed together under approximately 80 psi.

Following substantially full cure as described in Example 1 above, the transfer mold was removed. The result was a first laminae with the gel coat laminated thereto and having a top, clear, bubble free surface which was substantially in finished form.

EXAMPLE 3

Example 3 involved laminating a partially cured gel coat or thin casting material onto a flat sanded panel. In this example, the steps of Example 2 were followed except that a flat sanded panel was used as the first laminae. The result was a plywood panel with a laminated gel coat applied thereto which was bubble free and with an outer surface substantially in finished form.

EXAMPLE 4

In this case a urethane coating was applied to a particle board substrate. The substrate can be flat or contoured, with a matching female mold. The transfer sheet or mold was polished and waxed with a mold release typical of the fiberglass casting industry. The mold was then sprayed with an aliphatic urethane coating as manufactured by Futura Coatings under the name Futurathane 4000. The coating applied was 6–8 mils thick. The coating was allowed to cure for 15–20 minutes. At this point the film was cured to a viable dry film with a hint to surface tack. A coating of 8 mils of flexible polyester material was then applied to the surface. The substrate and the transfer surface was then brought into face-to-face registration and placed in the vacuum chamber. A vacuum of 24 inches of mercury was then pulled and the pieces were pressed together under 50 psi. Assembly was removed from the chamber and allowed to cure for 30 minutes. This part was separated from the mold and placed in an oven at 130° F. for eight hours to post cure. The surface was transferred to the substrate resulting in an excellent writing or work surface.

EXAMPLE 5

A panel of solid white uniform color was created by the following procedure. A matrix of 27% by weight promoted orthophthalic casting resin, 70% by weight alumina hydrate, 2% methyl ethyl ketone peroxide catalyst and 1% titanium dioxide pigment was thoroughly combined in a vacuum mixer. The resin was preheated to 100° F. to reduce viscosity. The mixer combined the mixture in vacuum conditions to avoid air entrapment in the final product. Commercial examples of vacuum mixing machines commonly used in the cultural marble industry are made by Gruber Manufacturing, Venus Manufacturing and Respecta America. The material was then spread over a 2 foot by 4 foot sheet of waxed glass by means of a doctor blade to a thickness of 3/16". The viscous liquid was constrained by 3/16" tall borders on the perimeter of the glass caul sheet. A transfer sheet of $\frac{1}{4}$" tempered glass was then mechanically positioned by means of patches of Velcro to the upper platen of a vacuum press. The glass had been prepared with a wax mold released and buffed to a polished surface. The matrix on its mold sheet was inserted in the press and brought into registration with the glass mold sheet. The mold sheet was 23$\frac{1}{2}$"×47$\frac{1}{2}$" and when placed in proper registration with the basting fit between the borders of the caul sheet. The press was then sealed and the air withdrawn to a negative pressure of 24 inches of mercury. The platen was then lowered until the mold sheet engaged the surface of the resin matrix. A pressure was then lowered until the mold sheet engaged the surface of the resin matrix. A pressure of 10 psi was applied.

The assembly was then removed from the press after the press was returned to atmospheric pressure. The assembly was then passed through a chamber of infrared heaters made by Vulcan Catalytic Systems. The material was subject to long wave infra-red radiation for 2.5 minutes. According to the manufacturer of the heater system, energy added to the system would be 6,000 BTU's per square foot or a total of 48,000 BTU.

The energy brought the material to a gel stage and initiated an exothermic reaction powered by the catalyst. At 10 minutes the glass mold sheet was removed (peeled off) and the sheet was released from the bottom caul sheet. The sheet was then placed in a curing oven between two sheets of mylar and cured at 120° for eight hours. The resulting product had a glossy substantially defect free surface on the mold face.

EXAMPLE 6

A panel with a slate-like pattern therein and a high gloss outmold surface is fabricated by preparing a first laminae comprising a curable thermosetting resin system comprising 50 parts by weight of a promoted isopthalic polyester resin, manufactured by H & K Research of Hickory, N.C. under the number R0059, and 50 parts by weight of alumina trihydrate filler. These two components were first mixed together and then catalyzed with 2 parts benzoyl peroxide.

This resin system was tinted by adding 0.1 parts by weight of titanium dioxide. The material is strained through 60 mesh filter to remove particulate impurities. The resin mixture is then mixed by machine under vacuum conditions to remove air entrapped during mixing and filtering. The resin mixture is poured from a batch container into an open face tray mold comprising a $\frac{1}{8}$ inch thick aluminum mold sheet having a $\frac{1}{4}$ inch by 2 inch aluminum retainer ring and a $\frac{1}{4}$ inch by $\frac{3}{8}$ inch silicone seal. The open face tray mold is vibrated to level the resin mixture and to remove any additional entrapped air. An imprinted second laminae comprising a $\frac{1}{8}$ inch thick Teflon ® coated caul sheet having a slate-like (i.e., a plurality of ridges and waves) imprint is prepared. The second laminae having an imprinted surface is suspended above the first laminae in face-to-face registration using a compressible material (e.g., a foam rubber spacer). The first and second laminae are placed in a hot platen vacuum press manufactured by Wemhöner Co. of Stüttgart, Germany and modified for vacuum operation. The hot platen is set at 280° F. and a rapid vacuum (i.e., 29 inches of mercury in 5 seconds) is achieved by the use of a surge tank. The upper platen of the vacuum press is lowered to engage the silicone seal and then the resin mixture while maintaining face-to-face registration and vacuum conditions. A pressure of 50 psi is exerted on the platen. The vacuum is released and the panel is cured in three minutes. The press is opened, the first and second laminae removed, and the second laminae caul sheet is separated from the first laminae. The slate-like imprint surface of the second laminae is transferred to the first laminae.

Although the description of the preferred embodiment has been quite specific, it is contemplated that various modifications could be made without deviating from the spirit of the present invention. Accordingly, it is intended that the present invention by dictated by the appended claims rather than by the description of the preferred embodiment.

That which I claim is:

1. A method of forming a substrate having an imprinted surface on an outmold side of a thermosetting casting, the method, comprising the steps of:

(a) casting a first laminae having a first outmold surface by applying a curable thermosetting resin material onto a substrate or mold;

(b) providing a second laminae having an imprinted surface;

(c) positioning the first outmold surface and the imprinted surface of the second laminae in face-to-face registration with one another;

(d) generating substantial vacuum conditions in the area between said first outmold surface and said imprinted surface of the second laminae;

(e) pressing said first surface and said imprinted surface together under said substantial vacuum conditions of at least about 25 inches of mercury, to maintain face-to-face registration thereof such that said first outmold surface and said imprinted surface are substantially stationary during curing, and to transfer the imprint of said imprinted surface to the first outmold surface, and to contain any volatile components of the curable thermosetting resin material of the first laminae while allowing said resin material to cure; and (f) separating the first outmold surface and second laminae having said imprinted surface thereon, to provide a substrate comprising the first laminae having the imprinted surface of the second laminae.

2. The method of claim 1 wherein the curable resin material of the first laminae is an unsaturated polyester resin.

3. The method of claim 1 wherein the curable resin material of the first laminae is substantially uncured before said first outmold surface and said imprinted surface are positioned in face-to-face registration with one another.

4. The method of claim 1 wherein the first and second surfaces are pressed together at a pressure between about 50 psi and about 80 psi.

* * * * *

UNITED STATES PATENT AND TRADEMARK OFFICE
CERTIFICATE OF CORRECTION

PATENT NO. : 5,298,212
DATED : 29 March 1994
INVENTOR(S) : Stecker

It is certified that error appears in the above-indentified patent and that said Letters Patent is hereby corrected as shown below:

Column 10, Line 38, before "inch thick" delete "5/8" and insert --1/8--.

Signed and Sealed this

Ninth Day of August, 1994

Attest:

BRUCE LEHMAN

Attesting Officer

Commissioner of Patents and Trademarks